United States Patent [19]
Taylor et al.

[11] Patent Number: 5,194,847
[45] Date of Patent: Mar. 16, 1993

[54] APPARATUS AND METHOD FOR FIBER OPTIC INTRUSION SENSING

[75] Inventors: Henry F. Taylor; Chung E. Lee, both of College Station, Tex.

[73] Assignee: Texas A & M University System, College Station, Tex.

[21] Appl. No.: 737,449

[22] Filed: Jul. 29, 1991

[51] Int. Cl.⁵ .................... G08B 13/10; G08B 13/18
[52] U.S. Cl. .................... 340/557; 340/541; 340/600; 340/666
[58] Field of Search ............ 340/557, 541, 666, 600, 340/556

[56] References Cited

U.S. PATENT DOCUMENTS

| | | | |
|---|---|---|---|
| 4,367,460 | 1/1983 | Hodara | 340/550 |
| 4,477,725 | 10/1984 | Asawa et al. | 250/227.16 |
| 4,482,890 | 11/1984 | Forbes et al. | 340/666 |
| 4,654,520 | 3/1987 | Griffiths | 250/227.14 |
| 4,699,513 | 10/1987 | Brooks et al. | 356/345 |
| 4,759,627 | 7/1988 | Thylén et al. | 250/227.14 |
| 4,770,535 | 9/1988 | Kim | 356/345 |
| 4,848,906 | 7/1989 | Layton | 356/345 |
| 4,928,004 | 5/1990 | Zimmermann et al. | 250/227.14 |
| 4,931,771 | 6/1990 | Kahn | 340/556 |
| 4,994,668 | 2/1991 | Lagakos et al. | 250/227.19 |

OTHER PUBLICATIONS

Griffiths, Garry D. "Fiber–Optic Sensors, Systems and Applications in Physical Security" Pilkington PE Limited Sales Article.

*Primary Examiner*—Glen R. Swann, III
*Attorney, Agent, or Firm*—Baker & Botts

[57] ABSTRACT

Apparatus for sensing intrusion into a predefined perimeter comprises means for producing a coherent pulsed light, which is injected into an optical sensing fiber having a first predetermined length and positioned along the predefined perimeter. A backscattered light in response to receiving the coherent light pulses is produced and coupled into an optical receiving fiber. The backscattered light is detected by a photodetector and a signal indicative of the backscattered light is produced. An intrusion is detectable from the produced signal as indicated by a change in the backscattered light. To increase the sensitivity of the apparatus, a reference fiber and an interferometer may also be employed.

35 Claims, 4 Drawing Sheets

APPARATUS AND METHOD FOR FIBER OPTIC INTRUSION SENSING

TECHNICAL FIELD OF THE INVENTION

This invention relates in general to the field of intrusion sensors. More particularly, the present invention relates to apparatus and a method for fiber optic intrusion sensing.

BACKGROUND OF THE INVENTION

Intrusion sensors are widely used in security systems to monitor the boundaries of a well defined area in order to detect the presence, location and motion of people and vehicles. Exemplary sites that may benefit from the use of such security systems are national borders, boundaries of military installations, nuclear power plants, prisons, and businesses. A number of existing intrusion sensors based on seismic, ultrasonic, infrared, and magnetic technologies have been employed, but are unfavorable for numerous reasons. These existing systems are expensive, difficult to conceal, have high false alarm rates, and are capable of providing coverage for only a limited portion of a perimeter.

By way of illustration, in the particular application of intrusion sensing to the monitoring of national borders to detect and apprehend illegal drug smugglers or illegal aliens, the border terrain under surveillance may be vast and rugged. The sensor system employed in this application must not only detect an intrusion but must also be able to determine the location of the intrusion along the monitored border. The sensor system must also be easily concealable to prevent tampering. Furthermore, such a system must have and maintain a record of low false alarms. Conventional intrusion sensing systems are not able to meet such stringent requirements or cannot provide satisfactory performance without incurring prohibitive costs.

Accordingly, it is desirable to provide an intrusion sensing system which provides intrusion detection as well as the location of intrusion. It is further desirable that such sensing system be deployable in a reasonable manner over a vast area, such as for the purpose of monitoring a national border.

SUMMARY OF THE INVENTION

In accordance with the present invention, apparatus and a method for intrusion sensing are provided which substantially eliminate or reduce disadvantages and problems associated with prior systems.

In one aspect of the present invention, apparatus for sensing intrusion into a predefined perimeter is provided. The intrusion sensing apparatus comprises a coherent light pulse source injecting coherent light pulses into an optical sensing fiber having a first predetermined length and positioned along the predefined perimeter. Light is backscattered from the optical sensing fiber and coupled into an optical receiving fiber. The backscattered light is detected by a photodetector coupled to the optical receiving fiber and a signal is produced in response thereto. An intrusion is detectable as a change in the produced signal.

In another aspect of the present invention, apparatus for sensing intrusion into a predefined border is provided. The apparatus includes a coherent light pulse source injecting coherent light pulses into an optical sensing fiber placed along the border and having a predetermined length. An optical receiving fiber is optically coupled to the optical sensing fiber and receives a backscattered light therefrom. A fiber optic interferometer with unequal path lengths is coupled to the optical receiving fiber and produces a modification of the backscattered light due to optical interference. A photodetector coupled to the interferometer produces a signal in response thereto. An intrusion is detectable as a change in the produced signal.

In yet another aspect of the present invention, apparatus for intrusion sensing includes a coherent light pulse source producing a plurality of coherent light pulses. A sensing fiber placed along a border being monitored receives the coherent light pulses and produces backscattered light. A reference fiber also receives the coherent light pulses and produces a backscattered light. The backscattered light from both fibers is allowed to mix coherently to produce an interference pattern which is received by a photodetector. A change in the photodetector signal is indicative of an intrusion.

In another aspect of the present invention, a method for sensing intrusion into a predefined perimeter is provided. The method comprises the steps of producing a plurality of coherent light pulses and delivering the plurality of coherent light pulses into an optical sensing fiber having a first predetermined length and being positioned along the predefined perimeter. Backscattered light is produced in the optical sensing fiber and a signal indicative of the backscattered light is generated. An intrusion is indicated by a changed in the signal.

In still another aspect of the present invention, an intrusion sensing method is provided which injects coherent light pulses into a length of sensing fiber placed along the border being monitored. Backscattered light is produced and injected into a fiber optic interferometer with unequal path lengths. Light from the interferometer is then detected by a photodetector which produces a signal that indicates an intrusion when a change in the interference pattern occurs.

In another aspect of the present invention, an intrusion sensing method provides, in addition, the step of injecting the plurality of coherent light pulses into a reference fiber, which also produces backscattered light that is also injected into the receiving fiber. The backscattered light from the sensor and reference fibers are allowed to mix coherently to produce an interference pattern. Thereafter the light is detected and serves to indicate an intrusion when a change or perturbation in the photodetector signal occurs.

A further important technical advantage is the concealability, versatility and relatively low cost of the present intrusion sensor.

An important technical advantage of the present invention provides an intrusion sensing apparatus capable of monitoring a vast area or a distance extending several kilometers or tens of kilometers.

Another important technical advantage provides an intrusion sensing apparatus which can detect an intrusion as well as determine substantially the location of the intrusion along the monitored border or perimeter.

BRIEF DESCRIPTION OF THE DRAWINGS

For a better understanding of the present invention, reference may be made to the accompanying drawings, in which.

DETAILED DESCRIPTION OF THE INVENTION

Figure 1:
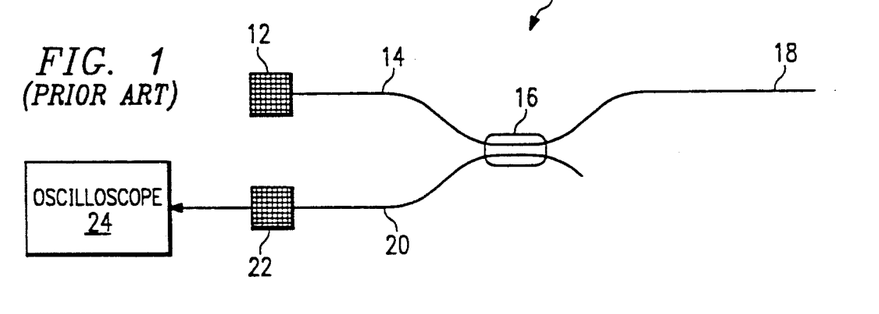
FIG. 1 is a simplified schematic drawing of a conventional optical time-domain reflectometer (OTDR) used in the telecommunications industry.

With reference to the drawings, FIG. 1 illustrates a conventional optical time-domain reflectometer (OTDR) 10 commonly used in the telecommunications industry to detect breakage in fiber optic cables. A semiconductor laser 12 produces light pulses of low coherence which are injected into a fiber 14. The spectral width of light pulses generated by laser 12 may be in the range of 100 MHz to 10 GHz. A fiber coupler 16 optically couples fiber 14 with another fiber 20, so that a portion of the backscattered light from fiber 18 produced by a phenomenon called Rayleigh backscattering is injected into fiber 20. A photodetector 22 is coupled to fiber 20 to receive the backscattered light and produces an electrical signal which is displayable by an oscilloscope 24.

Figure 2:
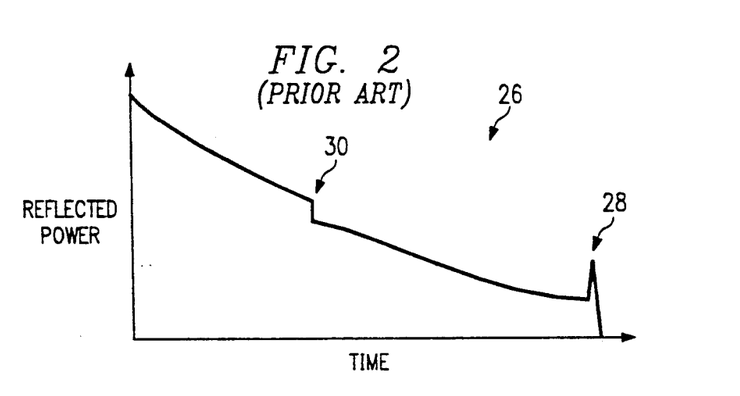
FIG. 2 is a reflected power vs. time graph of an output from the conventional OTDR.

FIG. 2 depicts an exemplary output waveform representative of the power of the backscattered light, as detected by photodetector 22, versus time. Discontinuities 28 and 30 in the waveform such as shown in FIG. 2 indicate the presence and location of breaks (28) or localized attenuation (30) in fiber 18. Conventional OTDR systems 10 perform adequately for detecting breaks in telecommunications fiber optics cables, but are ill-suited to intrusion sensing applications because they are not sensitive enough to either acoustic waves or pressure.

Figure 3:
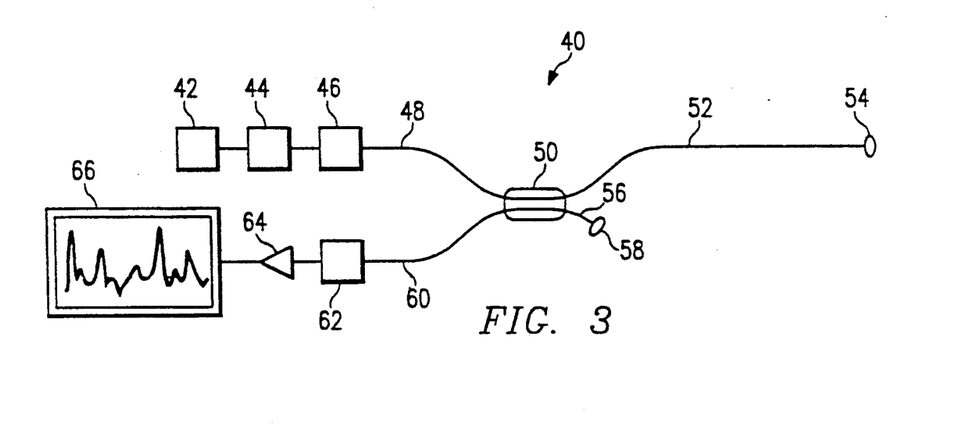
FIG. 3 is a simplified schematic of an embodiment of intrusion sensing apparatus constructed in accordance with the present invention.
Figure 9:
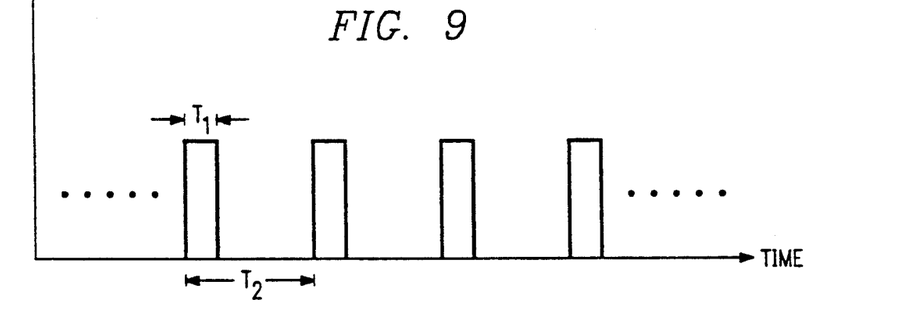
FIG. 9 is an optical power vs. time graph of the coherent pulsed light input used in the intrusion sensing apparatus.

Referring to FIG. 3, a simplified schematic of an embodiment 40 of apparatus for intrusion sensing constructed in accordance with the present invention is shown. A continuous, single mode laser 42 functions as the source of coherent light. Laser 42 could be a semiconductor laser diode, a solid state laser such as a neodymium yttrium aluminum garnet (Nd:YAG) laser or other lasers which produce a suitably narrow spectral line. A laser diode used on laser 42 preferably has an external cavity (not shown) to achieve line narrowing or a high degree of spectral purity. The spectral width of the laser output from laser 42 is preferably of the order of 10 kHz. An optical isolator 44 may be coupled to the output of laser 42 to prevent destabilization of the laser spectral purity due to optical feedback from the rest of the system. The coherent light passes through optical isolator 44 and enters an optical intensity modulator 46, which is operating in a pulsed mode to produce short pulses of coherent light. Optical intensity modulator 46 can be of acousto-optic or electro-optic design, either of bulk optical or integrated optic construction. Alternatively, optical intensity modulator 46 can be an all-fiber acousto-optic device. Still another alternative is to use a pulsed semiconductor optical amplifier as optical intensity modulator 46, in which case the light from laser 42 is amplified as well as modulated. Light pulses of high spectral purity are then injected into a fiber 48. FIG. 9 is a graph illustrating the optical power of the coherent light pulses versus time, where the width of each pulse is $T_1$ and the time between pulses is $T_2$. For example, $T_1$ can be approximately 100 nsec and $T_2$ can be approximately 100 μsec. The derivation and computation of $T_1$ and $T_2$ are discussed below. The spectral width of laser 42 is preferably as narrow as possible. More specifically, the spectral width is related to $T_1$ such that the spectral width is less than $0.1T_1$ and is preferably less than $0.01T_1$.

A fiber coupler is a conventional device typically having two arms on each side, where if light enters the coupler carried on one arm on a first side, the light exits the coupler equally distributed on the two arms on the second side, and vice versa. Such a fiber coupler is known as a "3 dB" device. Fiber 48, which is coupled to optical intensity modulator 46 at one end, is coupled to the first side of a fiber coupler 50 at the other. A sensing fiber 52 terminating in a non-reflecting end 54 is coupled to the second side of fiber coupler 50. Sensing fiber 52 is preferably encased in a fiber cable (not shown) and may be as long as 50 km due to the relatively low loss of optical fibers. A fiber 56 also with a non-reflecting end 58 is connected to fiber coupler 50 on the same side. Another fiber 60 is coupled to fiber coupler 50 on the first side and optically connected to sensing fiber 52 by fiber coupler 50. The other end of fiber 60 is coupled to a photodetector 62, which is coupled to an electronic amplifier 64.

Figure 10:
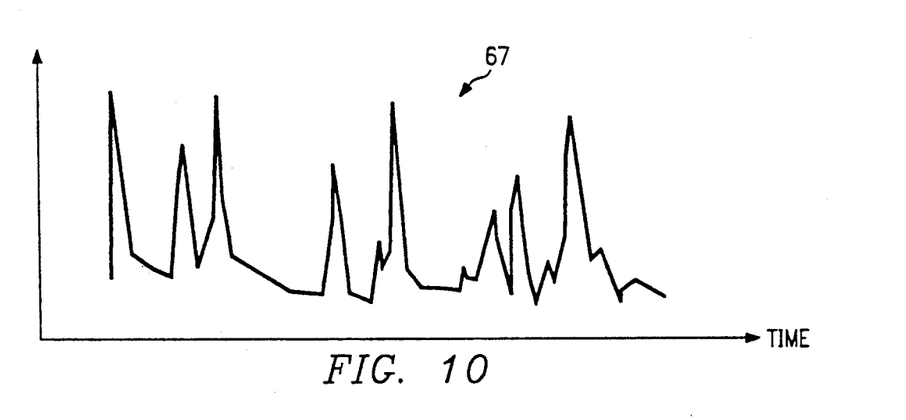
FIG. 10 is a graphical depiction of an exemplary output signal from the intrusion sensing apparatus.
Figure 11:
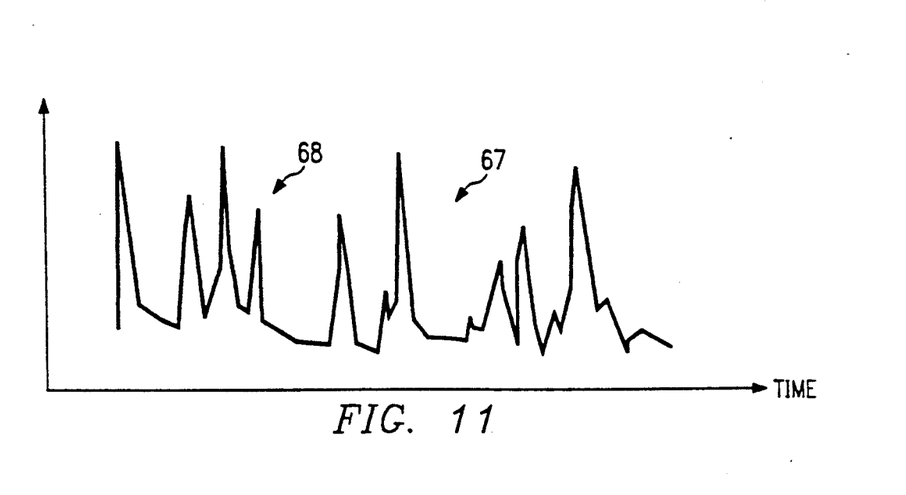
FIG. 11 is a graphical depiction of an exemplary output signal from the intrusion sensing apparatus when an intrusion is detected.

Therefore, coherent light pulses are coupled into sensing fiber 52 by fiber coupler 50 and light backscattered from sensing fiber 52 due to Rayleigh backscattering is coupled into fiber 60, which is then received by photodetector 62. Photodetector 62 converts the light energy into an electrical signal and supplies it to amplifier 64. Amplified output signal 66 is a seemingly random signal plotted against time, also shown in FIG. 10. Signal 67 in FIG. 10 represents a moving-time-window interference pattern for light backscattered from sensing fiber 52. This pattern represents the interference of backscattered light from different parts of sensing fiber 52 which arrive at photodetector 62 at the same time. If sensing fiber 52 is subjected to impinging acoustic waves or to pressure, a localized change in the effective refractive index of sensing fiber 52 is induced. The change will occur at a time corresponding to the location of the intrusion along sensing fiber 52. FIG. 11 illustrates signal 67 showing the effect of localized phase perturbation as a spike 68 in signal 67. The change in the detected signal depicted in FIG. 11 results from the different relation of the phases of the light backscattered from portions of sensing fiber 52 induced by localized phase perturbation. The temporal extent of the change is limited to the temporal characteristics of the optical pulse injected into sensing fiber 52.

In operation, sensing fiber 52 may be buried one to two feet underground to detect foot or vehicular traffic, placed underwater to detect powered boats or swimmers, or aerially or above ground to detect low-flying aircraft. The impinging acoustic waves or pressure on sensing fiber 52 causes a change in the fiber's effective refractive index. This change is manifested in the backscattered light from sensing fiber 52 caused by Rayleigh backscattering, which serves as the optical carrier. The backscattered light is passed through fiber coupler 50 into fiber 60, and then detected by photodetector 62. The output from photodetector 62 is then amplified by amplifier 64.

When sensing fiber 52 is disturbed by either pressure or acoustic waves, the backscattered light is altered at a time corresponding to the location of the disturbance. Using digital signal processing methods, the amplified signal may be digitized and processed in a time-resolved manner, such as those used in pulsed-radar signal processing. For example, the backscattered signal is divided and grouped into a number of time bins according to the time delay thereof, where each time bin corresponds to a length of sensing fiber 52 located at a particular distance from fiber coupler 50 along sensing fiber 52. A phase change in the backscattered signal in a time bin would indicate some traffic across the perimeter being monitored at the location corresponding to that time bin. Additional signal processing may be used to increase the sensitivity of the system and further minimize false alarm rates. Signature analysis may also be used to identify the type of intruder, i.e., to distinguish between humans, vehicles, and animals.

Figures 4, 7:
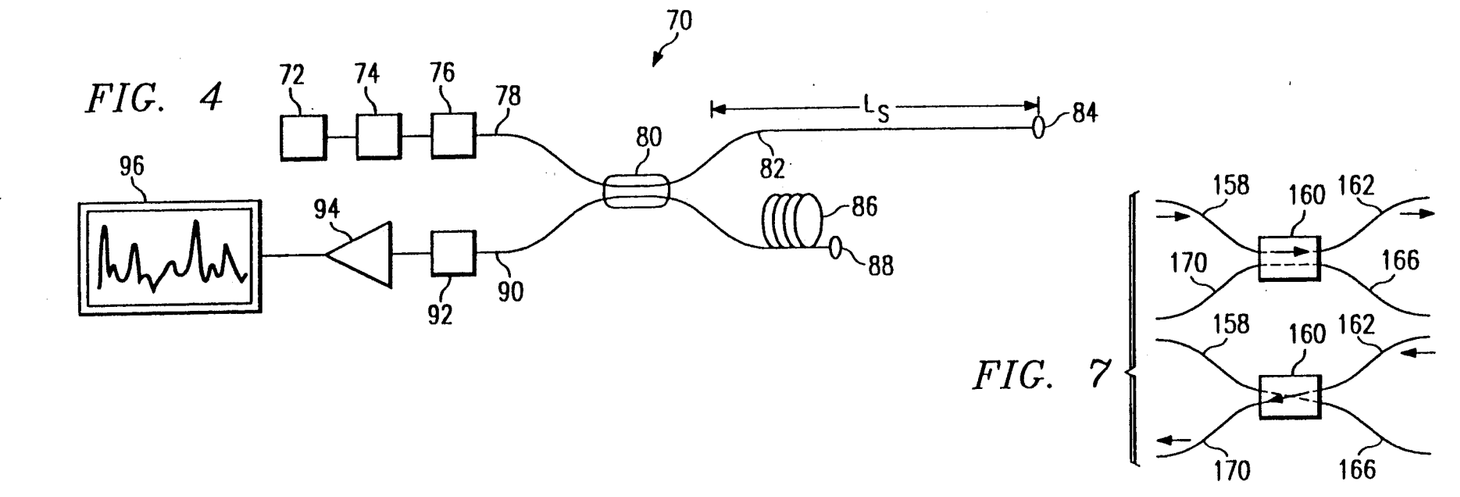
FIG. 4 is a simplified schematic of an embodiment of the intrusion sensing apparatus constructed in accordance with the invention and using a reference fiber.
FIG. 7 illustrates the operating states of the optical switch used in apparatus of FIG. 6.

Referring to FIG. 4, another embodiment 70 of the present invention is shown. Embodiment 70 is substantially similar to embodiment 40 shown in FIG. 3, and includes a single mode, continuously operating laser 72 coupled to an optical isolator 74 and a pulsed optical intensity modulator 76. The coherent pulsed light output from optical intensity modulator 76 is injected into a fiber 78, which is coupled to a fiber coupler 80. Fiber coupler 80 couples fiber 78 to a sensing fiber 82 of a predetermined length $L_s$, terminating in a non-reflecting end 84. A reference fiber 86, having a non-reflecting end 88 and protected from refractive-index perturbations, is also optically coupled to fiber 78 by fiber coupler 80. The length of reference fiber 86 is comparable to $L_s$, or the length of sensing fiber 82. A fiber 90 is coupled to the receiving side of fiber coupler 80 and is further connected to a photodetector 92. Photodetector 92 is coupled to an amplifier 94.

In operation, fiber coupler 80 optically couples fiber 78 to sensing fiber 82 and reference fiber 86 to allow coherent light pulses of approximately equal intensity to travel down both fibers 82 and 86. Light backscattered from both sensing fiber 82 and reference fiber 86 mixes at fiber coupler 80, after which it is detected by photodetector 92. Amplifier 94 then amplifies the signal output from photodetector 92. In this arrangement, a localized change in the effective refractive index of sensing fiber 82, indicative of an intrusion, affects output signal 96 in not only the time bin associated with the position of intrusion, but also the output signal in all time bins subsequent thereto.

Figure 5:
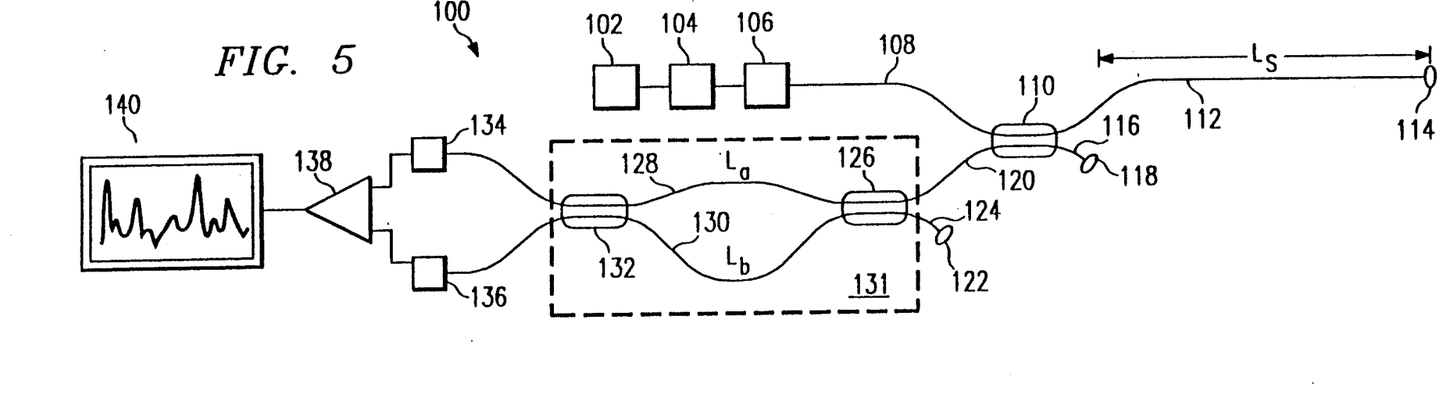
FIG. 5 is a simplified schematic of a preferred embodiment of the intrusion sensing apparatus constructed in accordance with the invention and incorporating a Mach-Zehnder interferometer.

Referring to FIG. 5, a preferred embodiment 100 of the present invention using a Mach-Zehnder interferometer is shown. Embodiment 100 includes a single mode, continuously operating laser 102 which produces light of a high degree of spectral purity. This coherent light is received by an optical isolator 104 and pulsed by an optical intensity modulator 106, as described above. The coherent pulses of light are injected into a fiber 108, which is coupled to a first fiber coupler 110. A sensing fiber 112 of length $L_s$, having a non-reflecting end 114, is optically coupled to fiber 108 by first fiber coupler 110. A fiber 116, also having a non-reflecting end 118, is also optically coupled to fiber 108 by fiber coupler 110. A fiber 120 connects first fiber coupler 110 to a second fiber coupler 126. Second fiber coupler 126 also has a fiber 122 with a non-reflecting end 124 coupled thereto. Fiber coupler 126 optically connects fiber 120 with two fibers 128 and 130 which are further coupled to a third fiber coupler 132.

Fibers 128 and 130 form the two arms of a Mach-Zehnder interferometer 131 as known in the art, which also includes second fiber coupler 126 and third fiber coupler 132. Fibers 128 and 130 are of unequal lengths represented by $L_a$ and $L_b$, respectively. Two photodetectors 134 and 136 are coupled to the two outputs from Mach-Zehnder interferometer 131. A differential amplifier 138 is coupled to the outputs of photodetectors 134 and 136 and produces an output signal 140 that may be further analyzed by digital signal processing methods as known in the art.

Intrusion sensing apparatus 100 shown in FIG. 5 probably has the highest sensitivity of contemplated embodiments described above and below through the use of Mach-Zehnder interferometer 131. In operation, the backscattered light from sensing fiber 112 passes through fiber coupler 110 and is injected into fiber 120. As light passes through fiber coupler 126, both arms 128 and 130 of interferometer 131 receive approximately half of the light in fiber 120. The light passing through arms 128 and 130 then mixes coherently at fiber coupler 132. At any instant in time, the light arriving at fiber coupler 132 through arm 128 having length $L_a$ is the light that was backscattered from a point in sensing fiber 112 at a distance $(L_b-L_a)/2$ downstream from the light arriving at coupler 132 through arm 130 of length $L_b$. Optical outputs from interferometer 131 are detected by two photodetectors 134 and 136 and subtracted in differential amplifier 138.

Output signal 140 from differential amplifier 138 represents a moving-time-window interference pattern for light backscattered from locations in sensing fiber 112 separated by a distance $(L_b-L_a)/2$, and varies with time in an apparently random fashion. A localized change in the effective refractive index of sensing fiber 112 indicative of an intrusion causes a change in output signal 140 occurring at a time corresponding to the intruder's location along sensing fiber 112. However, unlike implementation 70 shown in FIG. 4, a localized perturbation in the effective refractive index of sensing fiber 112, indicative of an intrusion, affects output signal 140 in only the time bin associated with the position of intrusion and not in all subsequent time bins. In particular, the time delay $T_i$ corresponding to an intruder located a distance $L_i$ along sensing fiber 112 can be expressed as:

$$T_i = \frac{2L_i n_g}{c} \quad (1)$$

where c is the free-space velocity of light and $n_g$ is the group refractive index of sensing fiber 112. Alternatively, the distance $L_i$ can be expressed as:

$$L_i = \frac{cT_i}{2n_g} \quad (2)$$

Typically, $n_g$ is approximately 1.46 for silica fiber. Computing for $T_i$ using equation (1), if $L_i$ is equal to 1 km, then $T_i$ is equal to 9.7 μsec, where c is equal to $3 \times 10^8$ m/sec.

Further consideration must be given to the spatial resolution of the output signal. Spatial resolution S is related to the light pulse width $T_1$ (shown in FIG. 9) and can be expressed as:

$$S < \frac{cT_1}{2n_g} \quad (3)$$

It can be appreciated from equation (3) that better spatial resolution can be achieved by a shorter light pulse input. For example, if $T_1$ is equal to 100 nsec, then S is less than 10.3 m. The spatial resolution is also related to the lengths $L_a$ and $L_b$ of arms 128 and 130, respectively, of Mach-Zehnder interferometer 131 in the following manner:

$$S < \frac{(L_b - L_a)}{2} \quad (4)$$

Thus, S is less than 10 m if the quantity $(L_b - L_a)$ is equal to 20 m.

In general, it is preferable to have:

$$T_1 \approx \frac{n_g(L_b - L_a)}{c} \quad (5)$$

so that if the light pulse width $T_1$ equals 100 nsec, then the quantity $(L_b - L_a)$ is approximately 20 m, a preferable value for the difference of arm lengths 128 and 130. The time $T_2$ between the pulses, as shown in FIG. 9, is related to sensor fiber length $L_s$ and can be expressed by the following:

$$T_2 > \frac{2L_s n_g}{c} \quad (6)$$

Therefore, if the sensor fiber length $L_s$ is 10 km, then $T_2$ is greater than 97 μsec.

Figure 6:
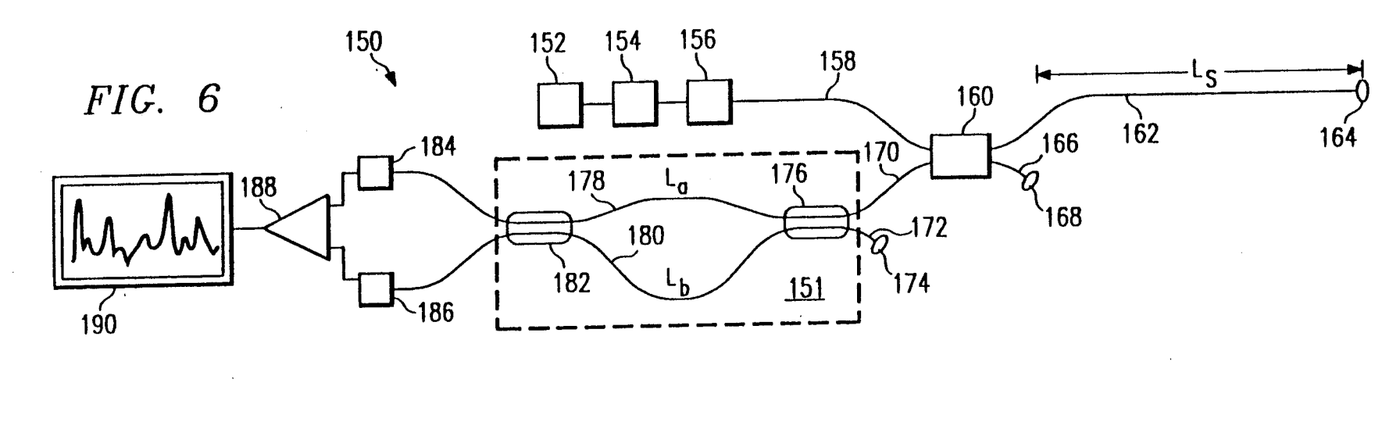
FIG. 6 is a simplified schematic of a preferred embodiment of the intrusion sensing apparatus constructed in accordance with the invention and using an optical switch.

Referring to FIG. 6, an alternate embodiment 150 also using a Mach-Zehnder interferometer 151 is shown. The sensing apparatus comprises a coherent light pulse generator, which includes a single mode, continuously operating laser 152 isolated from feedback from the rest of the apparatus by an optical isolator 154, and a pulsed optical intensity modulator 156. The coherent light pulses are injected into and carried by a fiber 158 which is optically coupled to a sensing fiber 162 by an optical switch 160. Sensing fiber 162 is an optical fiber encased in a cable, and has a length $L_s$ and terminates in a non-reflecting end 164. Sensing fiber 162 is placed along a border where intrusion sensing is desired. A fiber 166, also with a non-reflecting end 168, may be coupled to optical switch 160. A fiber 170 is optically coupled to sensing fiber 162 by optical switch 160 and leads into Mach-Zehnder interferometer 151. Interferometer 151 consists of two fibers 178 and 180 having lengths $L_a$ and $L_b$, respectively, connected between two fiber couplers 176 and 182. The outputs of interferometer 151 are supplied to photodetectors 184 and 186, the outputs of which are then supplied to a differential amplifier 188. A possible waveform of the output signal 190 of differential amplifier 188 is shown.

Basically, intrusion sensing apparatus 150 operates in a similar fashion to apparatus 100 of FIG. 5. However, fiber coupler 110 of apparatus 100 is replaced by optical switch 160. Because a 3 dB loss is experienced when light passes through a fiber coupler in both the forward and reverse directions, a total loss of 6 dB can be eliminated by substituting optical switch 160 in place of fiber coupler 110. Referring also to FIG. 7, the two-state operation of optical switch 160 of FIG. 6 is shown. In the first state of operation, fiber 158 is coupled to sensing fiber 162 without interference from fiber 166 to allow coherent light pulses from pulsed optical intensity modulator 156 to reach sensing fiber 162 without substantial loss. In the second state of operation, sensing fiber 162 is coupled to fiber 170, so that the backscattered light may enter fiber coupler 176 of interferometer 151 without substantial loss. Constructed in this manner, virtually no loss is experienced, thus making more efficient use of the optical power in the coherent light pulses. Optical switch 160 may be an electro-optic or acousto-optic integrated optic device, both commercially available, or an acousto-optic fiber device.

Figure 8:
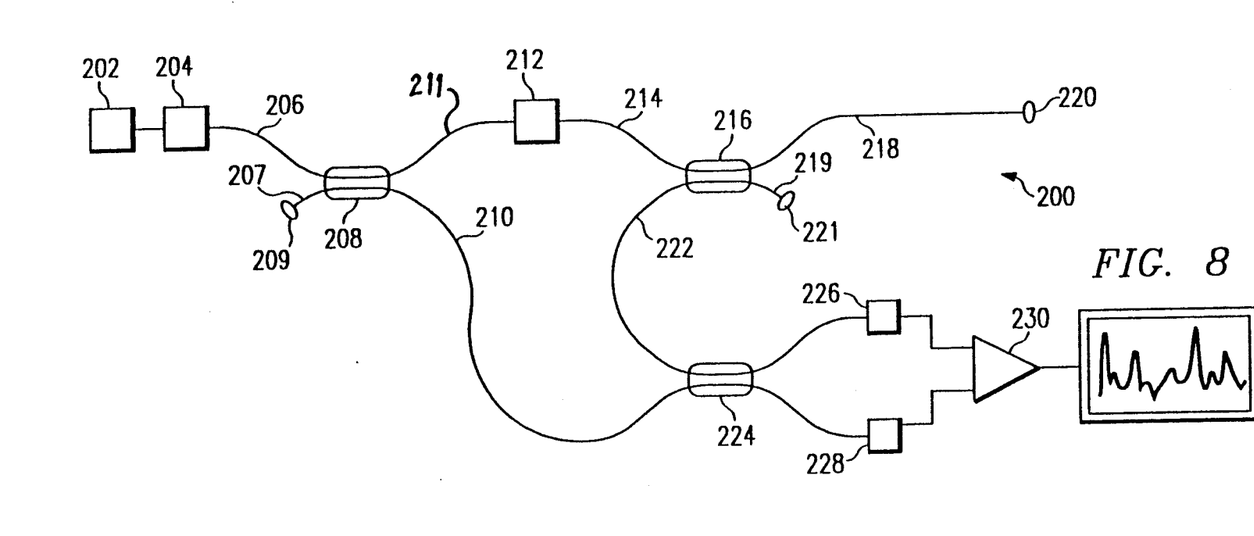
FIG. 8 is a simplified schematic of another embodiment of the intrusion sensing apparatus constructed in accordance with the present invention.

Referring presently to FIG. 8, another arrangement 200 of the intrusion sensing apparatus is shown. A narrow line source such as a single mode, continuously operating laser 202 is coupled to an optical isolator 204. The optical output from optical isolator 204 is injected into a fiber 206, which is optically coupled by a fiber coupler 208 with fibers 210 and 211. A fiber 207 with a non-reflecting end 209 is coupled to fiber coupler 208. The other end of fiber 211 is coupled to a pulsed optical intensity modulator 212. Fiber 214 connects the output of pulsed optical intensity modulator 212 to a second fiber coupler 216. A sensing fiber 218 extends from fiber coupler 216 and terminates in a non-reflecting end 220. A fiber 219 with a non-reflecting end 221 is coupled to the same side of fiber coupler 216. Fiber coupler 216 optically couples sensing fiber 218 with yet another fiber 222. Fibers 210 and 222 are then coupled to a third fiber coupler 224, the other side of which is connected to a pair of photodetectors 226 and 228. The outputs of photodetectors 226 and 228 are then supplied to a differential amplifier 230. The output of differential amplifier 230 is a signal 232 indicative of an intrusion into the monitored boundary.

Intrusion sensor 200 functions by allowing interference to occur between backscattered light caused by Rayleigh backscattering from sensing fiber 218 and the light produced by the light source, laser 202 and optical isolator 204, at fiber coupler 224 through fiber 210. The interference effect is detected by photodetectors 226 and 228 and processed by differential amplifier 232 as described above in conjunction with other embodiments. A localized change in the effective refractive index of sensing fiber 218 would cause a change in the interference pattern of the light, which is detectable by photodetectors 226 and 228. Such change indicates the occurrence of an intrusion, the approximate location of which can be computed as described above.

The main components from which the present invention may be constructed are commercially available. The following lists such commercially available parts manufactured by British Telecom and Du Pont Technologies of Wilmington Del. and their respective part numbers:

| Model Number | Part Name |
| --- | --- |
| TSL1000-1550 | Tunable External Cavity Semiconductor Laser |
| SOA1100-1550 | Semiconductor Optical Amplifier |
| OIC1100-1550 | Optical Isolator |
| IOC2000-1550 | Optical Integrity Modulator |

Additionally the following parts, part numbers and their manufacturer:

| Part Name | Part Number | Manufacturer |
| --- | --- | --- |
| PINFET optical receiver (photodetector) | LDPF0012 | Laser Diode Inc. New Brunswick, New Jersey |
| Fiber Coupler | SMC-08-50-2-A-1-S | Aster Milford, Massachusetts |
| Fiber Cable | 001-R14-11003-20 | Siecor Hickory, North Carolina |

It must be emphasized that the above listings of parts are but exemplary components that may be used in constructing the present invention, and one skilled in the art will appreciate that the invention is not necessarily so limited. The above-listed components implement specifically a light wavelength of 1550 nm. It is also apparent that the continuous coherent light beam from the laser may be converted into the coherent light pulses shown in FIG. 9 by the pulsed optical intensity modulator shown in the various embodiments, or by any device that may effectively and alternately allow the light to pass and not pass in a somewhat precise manner. One such device is the optical switch or modulator which may be an integrated optic device. With the current laser technology, such coherent light pulses cannot be achieved by turning the laser on and off, since the frequency of the laser output would change due to thermally induced "chirping" effects. It follows then that any narrow line source that is capable of emitting coherent pulses of light such as that shown in FIG. 9 may be incorporated into the present invention.

Although the present invention has been described in detail, it should be understood that various changes, substitutions and alterations can be made thereto without departing from the spirit and scope of the present invention as defined by the appended claims.

What is claimed is:

1. Apparatus for sensing intrusion into a predefined perimeter, comprising:
    means for producing a plurality of coherent light pulses having a spectral width less than $0.1T_1$, where $T_1$ is the width of each coherent light pulse;
    an optical sensing fiber having a first predetermined length receiving at least a portion of said plurality of coherent light pulses and being positioned along said predefined perimeter, said optical sensing fiber producing a backscattered light in response to receiving said plurality of coherent light pulses;
    an optical receiving fiber arranged to receive said backscattered light from said optical sensing fiber; and
    detecting means coupled to said optical receiving fiber for receiving said backscattered light and producing a signal indicative of an intrusion in response to a perturbation in said backscattered light.

2. The apparatus, as set forth in claim 1, wherein said coherent light pulse producing means comprises:
    a continuously operating laser producing a light; and
    means coupled to said laser for modulating said light and producing pulses of coherent light.

3. The apparatus, as set forth in claim 2, wherein said coherent light pulse producing means further comprises isolating means coupled to said laser for preventing optical feedback to said laser.

4. The apparatus, as set forth in claim 2, wherein said coherent light pulse producing means includes an optical switch.

5. The apparatus, as set forth in claim 2, wherein said coherent light pulse producing means includes an optical intensity modulator.

6. The apparatus, as set forth in claim 2, wherein said coherent light pulse producing means includes an optical amplifier operating in a pulsed mode.

7. The apparatus, as set forth in claim 1, further comprising a reference fiber having a predetermined length substantially equal to said first predetermined length of said optical sensing fiber and receiving at least a portion of said coherent pulsed light from said coherent pulsed light producing means and producing a backscattered light.

8. The apparatus, as set forth in claim 7, wherein said reference fiber has a non-reflecting end.

9. The apparatus, as set forth in claim 7, wherein said reference fiber is protected from refractive index perturbations.

10. The apparatus, as set forth in claim 7, wherein said optical receiving fiber is optically coupled to both said optical sensing fiber and said reference fiber to receive backscattered light therefrom.

11. The apparatus, as set forth in claim 1, wherein said optical sensing fiber terminates in a non-reflecting end.

12. The apparatus, as set forth in claim 1, further comprising means for optically coupling said optical sensing fiber and said optical receiving fiber.

13. The apparatus, as set forth in claim 12, Wherein said optical coupling means includes an optical switch.

14. The apparatus, as set forth in claim 12, wherein said optical coupling means includes a fiber coupler.

15. The apparatus, as set forth in claim 1, wherein said detecting means comprises a photodetector coupled to said optical receiving fiber for receiving said backscattered light and producing an electrical signal indicative of the optical power of said backscattered light.

16. The apparatus, as set forth in claim 15, wherein said detecting means further comprises means coupled to said photodetector for amplifying said electrical signal.

17. The apparatus, as set forth in claim 1, further comprising an interferometer coupled to said optical receiving fiber for optically mixing said backscattered light.

18. The apparatus, as set forth in claim 1, further comprising a Mach-Zehnder interferometer with unequal path lengths coupled to said optical receiving fiber for mixing said backscattered light.

19. The apparatus, as set forth in claim 1, further comprising:
second coupling means coupled to said optical receiving fiber;
third coupling means coupled to said second coupling means via a first and second fiber arm, the lengths of said first and second fiber arms being unequal, said received backscattered light traveling along said first and second fiber arms and mixing coherently at said third coupling means; and
said detecting means coupled to said third coupling means and receiving said optically mixed light from said interferometer, and producing an electrical signal indicative of an intrusion in response to a change in said optically mixed light.

20. The apparatus, as set forth in claim 19, wherein said detecting means comprises:
two photodetectors coupled to said third coupling means and producing two electrical signals indicative of the optical power of light in said optically mixed light; and
a differential amplifier receiving said two electrical signals and producing an output signal indicative of their difference.

21. The apparatus, as set forth in claim 19, wherein said electrical signal is indicative of an intrusion at a distance $L_i$ along said first predetermined length of said optical sensing fiber computable by:

$$L_i = \frac{cT_i}{2n_g},$$

where $T_i$ is the time delay associated with said perturbation, c is the free-space velocity of light, and $n_g$ is the group refractive index of said optical sensing fiber.

22. A method for sensing intrusion into a predefined perimeter, comprising the steps of:
producing a coherent pulsed light having a spectral width less than $0.1T_1$, where $T_1$ is the width of each coherent light pulse;
injecting at least a portion of said coherent pulsed light into an optical sensing fiber having a first predetermined length and positioned along said predefined perimeter;
producing a backscattered light in response to receiving said coherent pulsed light; and
receiving said backscattered light from said optical sensing fiber and producing a signal indicative of an intrusion in response to a perturbation in said backscattered light.

23. The method, as set forth in claim 22, wherein said coherent pulsed light producing step comprises the steps of:
operating a laser continuously and producing light; and
receiving said light and producing a plurality of coherent light pulses.

24. The method, as set forth in claim 23, wherein said coherent light pulse producing step further includes the step of preventing optical feedback to said laser.

25. The method, as set forth in claim 23, wherein said coherent light pulse producing step includes operating an optical switch.

26. The method, as set forth in claim 23, wherein said coherent light pulse producing step includes operating an optical intensity modulator.

27. The method, as set forth in claim 23, wherein said coherent light pulse producing step includes operating an optical amplifier in a pulsed mode.

28. The method, as set forth in claim 22, further comprising the steps of:
further injecting at least a portion of said coherent pulsed light into a reference fiber having a predetermined length substantially equal to said first predetermined length of optical sensing fiber;
producing a backscattered light therefrom; and
receiving and mixing said backscattered light from said optical sensing fiber and said reference fiber.

29. The method, as set forth in claim 22, further comprising the step of optically coupling said optical sensing fiber and said optical receiving fiber.

30. The method, as set forth in claim 29, wherein said coupling step includes operating an optical switch, opening said optical switch to deliver said coherent pulsed light to said optical sensing fiber and closing said optical switch to deliver said backscattered light to said optical receiving fiber.

31. The method as set forth in claim 29, wherein said coupling step includes providing a fiber coupler therebetween.

32. The method, as set forth in claim 31, further comprising the steps of:
receiving said backscattered light;
splitting said backscattered light into a first and second portion;
introducing a predetermined amount of time delay to said second portion;
coherently mixing said first and delayed second portions of backscattered light;
detecting an interference pattern; and
producing a signal indicative of said interference pattern.

33. The method, as set forth in claim 23, wherein said receiving step further comprises the step of photodetecting said backscattered light and producing an electrical signal indicative of the optical power of said backscattered light.

34. The method, as set forth in claim 23, wherein said receiving step further comprises the step of amplifying said electrical signal.

35. The method, as set forth in claim 22, further comprising the step of computing for a distance $L_i$ along said optical sensing fiber where said intrusion took place with:

$$L_i = \frac{cT_i}{2n_g},$$

where $T_i$ is the time delay associated with said perturbation, c is the free-space velocity of light, and $n_g$ is the group refractive index of said optical sensing fiber.

* * * * *

UNITED STATES PATENT AND TRADEMARK OFFICE
CERTIFICATE OF CORRECTION

PATENT NO. : 5,194,847
DATED : March 16, 1993
INVENTOR(S) : Henry F. Taylor et al.

It is certified that error appears in the above-identified patent and that said Letters Patent is hereby corrected as shown below:

Column 1, line 41, after "of", delete "intrustion" and insert -- intrusion --.

Column 2, line 29, after "a", delete "changed" and insert -- change --.

Column 4, line 26, after "than", delete "$0.1T_1$" and insert -- $0.1/T_1$ --.

Column 4, line 27, after "than", delete "$0.01T_1$" and insert -- $0.01/T_1$ --.

Column 8, line 39, after "207", delete "With" and insert -- with --.

Column 8, line 63, after "amplifier", delete "232" and insert -- 230 --.

Claim 1, Column 9, line 63, after "than", delete "$0.1T_1$" and insert -- $0.1/T_1$ --.

Claim 13, Column 10, line 50, after "12,", delete "Wherein" and insert -- wherein --.

Claim 22, Column 11, line 41, after "than", delete "$0.1T_1$" and insert -- $0.1/T_1$ --.

Signed and Sealed this

Twenty-first Day of December, 1993

Attest:

BRUCE LEHMAN

*Attesting Officer*  *Commissioner of Patents and Trademarks*